Post & Martin,
Washing Machine.

No. 109,938 Patented Dec. 6, 1870.

Witnesses.
John F. Smith
Oscar F. Newcomb

Inventor.
Samuel Post
Henry D. Martin

United States Patent Office.

SAMUEL POST AND HENRY D. MARTIN, OF YPSILANTI, MICHIGAN.

Letters Patent No. 109,938, dated December 6, 1870.

IMPROVEMENT IN WASHING-MACHINES.

The Schedule referred to in these Letters Patent and making part of the same.

*To all whom it may concern:*

Be it known that we, SAMUEL POST and HENRY D. MARTIN, of the city of Ypsilanti, in Washtenaw county and State of Michigan, have invented a new and useful Improvement in Washing-Machines; and we do hereby declare that the following is a full and exact description thereof, reference being had to the accompanying drawing and the letters of reference marked thereon.

Figure 1:
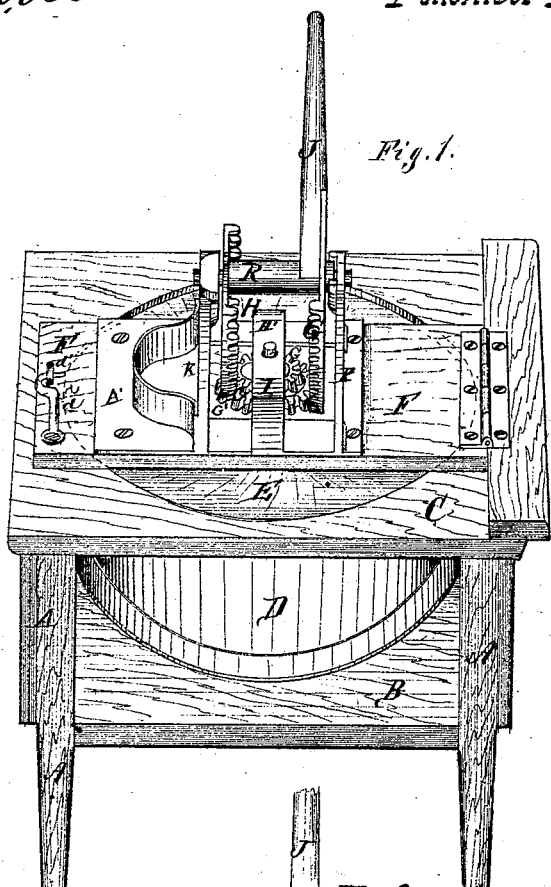
Figure 2:
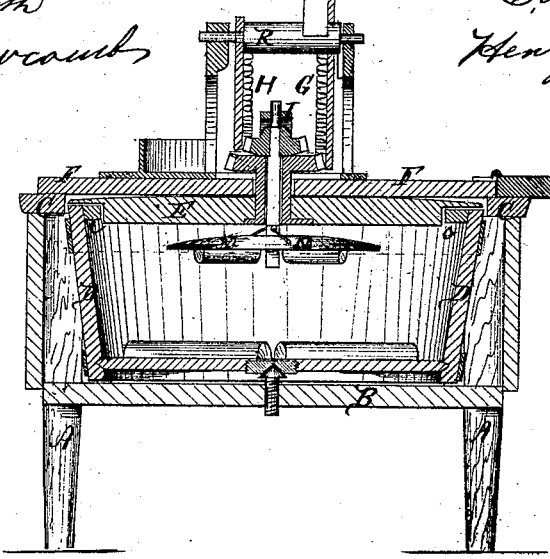

Figure 1 is a perspective view of the machine; and
Figure 2, a sectional view.

In the drawing—

A B and C refer to the parts constituting the frame of the machine; and

F F, to the cover of the tub, hinged to cross-piece C, and held closed by the hook and staple *a a*.

To the cover E is attached, by screws, the metallic plate A', and to the metallic plate the devices for giving motion to the machine, consisting of the circular braces or frame K K, shaft R, segmental gear H and G, upright shaft H', and pinions G' G".

The upright shaft with pinions G' G" are held in position by the strap I and pinion G', attached to the shaft, and rigidly attached to the cover of the tub E, and G" to the shaft and rubber of the machine, and motion given them by the lever J attached to the segment gear H and G, on opposite sides of the pinions G' G", and by which a half-circular motion is given, and reversed at each alternate action of the lever J.

The rubber M is attached to the upright shaft H' by cords passing through it and hanging loosely, and allowed a slight oscillating movement or motion when in use, as shown and described.

What we claim as our improvement in washing-machines, and desire to secure by Letters Patent, is—

The construction and combination of the metallic plate A' with the braces or frame K K, segmental gear H and G, shaft R, pinions G' G", upright shaft H', strap I, rubber M, tub D, cover F, with frame A B C, and lever J, all as shown and described, and for the purpose set forth.

SAMUEL POST,
HENRY D. MARTIN.

Witnesses:
C. M. LA RUE,
H. D. SANDERS.